United States Patent
Bruechmann et al.

(10) Patent No.: US 6,501,457 B1
(45) Date of Patent: Dec. 31, 2002

(54) CIRCUIT ARRANGEMENT FOR REGULATING LIGHT TRANSMISSION OF AN ELECTROCHROMIC GLASS PANE

(75) Inventors: Gerd Bruechmann, Buchholz; Ulrich Huetzen, Sereetz; Christian Wiese, Heeslingen, all of (DE)

(73) Assignee: Airbus Deutschland GmbH, Hamburg (DE)

( * ) Notice: Subject to any disclaimer, the term of this patent is extended or adjusted under 35 U.S.C. 154(b) by 206 days.

(21) Appl. No.: 09/586,285

(22) Filed: Jun. 2, 2000

(30) Foreign Application Priority Data

Jun. 2, 1999 (DE) .......................................... 199 25 335

(51) Int. Cl.[7] .............................. G09G 3/38; G02F 1/15; G02F 1/153
(52) U.S. Cl. ........................ 345/105; 359/265; 359/267; 359/275
(58) Field of Search ................................ 345/105, 212; 359/265, 267, 268, 269, 275, 601, 604

(56) References Cited

U.S. PATENT DOCUMENTS

| | | | |
|---|---|---|---|
| 3,938,131 A | * 2/1976 | Van Doorn et al. | 345/105 |
| 4,294,519 A | 10/1981 | Hashimoto | |
| 4,300,138 A | * 11/1981 | Nakauchi et al. | 345/105 |
| 4,426,643 A | * 1/1984 | Martin | 345/105 |
| 4,644,344 A | * 2/1987 | Larsen et al. | 345/105 |
| 4,649,382 A | * 3/1987 | Martin et al. | 345/105 |
| 5,365,365 A | * 11/1994 | Ripoche et al. | 345/105 |
| 5,384,578 A | 1/1995 | Lynam et al. | |
| 5,654,736 A | * 8/1997 | Green et al. | 345/105 |
| 5,956,012 A | * 9/1999 | Turnbull et al. | 345/105 |
| 6,084,700 A | * 7/2000 | Knapp et al. | 359/265 |

FOREIGN PATENT DOCUMENTS

| | | |
|---|---|---|
| DE | 19630812 | 2/1998 |
| DE | 19706918 | 8/1998 |

* cited by examiner

Primary Examiner—Bipin Shalwala
Assistant Examiner—David L. Lewis
(74) Attorney, Agent, or Firm—W. F. Fasse; W. G. Fasse

(57) ABSTRACT

A circuit arrangement can carry out a method for controlling the light transmission of an electrochromic glass that involves generating a control voltage that is applied to the electrochromic glass to bring about a desired transparency or lack of transparency. The method optimizes, i.e. minimizes, the electrical energy that must be applied to the electrochromic glass, with respect to magnitude and duration, while achieving the desired degree of transparency very quickly. The actual voltage on the glass is measured at certain intervals and compared with a reference voltage that corresponds to a desired light transmission. A control voltage of positive or negative polarity is applied to the electrochromic glass for a certain charging or discharging period, depending on the deviation of the actual voltage from the reference value, and the actual voltage on the glass is again measured and compared with the reference voltage. These steps are repeated until the actual voltage on the glass is substantially equal to the reference voltage. The control voltage is then switched off or reduced such that no control current flows in the glass, until a subsequent measurement determines that the actual voltage has fallen below the reference voltage by more than an acceptable threshold difference amount, at which point the control voltage is again switched on.

4 Claims, 2 Drawing Sheets

CIRCUIT ARRANGEMENT FOR REGULATING LIGHT TRANSMISSION OF AN ELECTROCHROMIC GLASS PANE

PRIORITY CLAIM

This application is based on and claims the priority under 35 U.S.C. §119 of German Patent Application 199 25 335.8, filed on Jun. 2, 1999, the entire disclosure of which is incorporated herein by reference.

FIELD OF THE INVENTION

The invention relates to a method of regulating the light transmission of an electrochromic glass pane, by generating an electrical voltage that is applied to the electrochromic glass pane and that is controlled dependent on the desired degree of light transmission, and by controlling the current that flows through the glass pane. The invention further relates to a circuit arrangement for implementing the method. Such electrochromic glass panes are especially suitable for use as the cockpit or cabin window panes of an aircraft, sunroofs and side windows of automobiles, and the like.

BACKGROUND INFORMATION

FIG. 1 shows a cross-section of a conventional electrochromic glass pane, which will simply be called an electrochromic glass herein. Two conventional glass panes 1, 2 are respectively arranged at each outer side of the electrochromic glass, and a transparent electrode layer 3, 4 is arranged directly adjacent to the respective glass panes 1, 2. A darkening or coloring layer 5, preferably a tungsten oxide layer, is arranged directly next to the transparent electrode layer 3. An electrolyte layer 6 and an ion storage layer 7 are arranged between the coloring layer 5 and the other transparent electrode layer 4. In order to vary the light transmission of such an electrochromic glass construction, the glass or its. components must be charged to a specific electrical potential. The voltage that is required to change the light transmission of the glass depends on the materials used. If a small electric potential exists between the electrodes 3, 4, then an ionic current flows into the, tungsten oxide layer. Electrons compensate the charge of the ions. The stored ions cause the originally transparent tungsten oxide layer to turn blue, thereby reducing the light transmission. This coloring or darkening effect can be reversed by shorting the circuit to reduce the voltage to zero or by applying a voltage of opposite polarity.

German Patent Laying-Open Publication DE 196 30 812 A1 discloses a transparent sunroof system for a vehicle. A transparent panel is slidably movable into an open position above or below another panel in the sunroof system in order to provide an opening in the roof. As a means of providing effective shade protection when the roof panel is closed and adequate transparency when the slidable panels are moved to an open position in which the panels are stacked one above the other, one of the two panels has an electrochromic layer that provides for variable light transmission or transparency. The transparency of the panel that is provided with the electrochromic layer can, for example, be varied by means of a variable resistor or potentiometer. Thus, for example, by applying a reduced voltage to a colored or darkened panel by means of the variable resistor, the panel can be "bleached", i.e., the transparency of the particular panel can be increased. Conversely, a transparent panel can be darkened or colored, i.e., the transparency can be decreased, by applying an increased voltage. According to this known technique, however, the increased voltage must be continuously applied to the glass without interruption, in order to maintain the reduced transparency condition. This is a disadvantage because the continuously applied higher voltage can have detrimental effects on the performance or service life of the glass, and requires increased energy, which is undesirable especially in a self-contained electrical system such as that of an automobile.

U. S. Pat. No. 5,384,578 (Lynam et al.) discloses a variable electrochromic light transmission system. The light transmission of a pane of glass is controlled by means of a memory time constant that is predetermined by the properties of the glass pane and a reference voltage set point. In this known system, the actual value of the light transmission is not determined, rather, the memory, time constant and the reference voltage set point control a drive signal or trigger signal that drives a multivibrator. The multivibrator generates a pulsed signal for charging the pane of glass.

SUMMARY OF THE INVENTION

In view of the above it is an object of the invention to provide a method of regulating the light transmission of an electrochromic glass that will optimize the electrical energy to be supplied to the electrochromic glass, with respect to magnitude and duration. It is a further object of the invention to provide a circuit arrangement for implementing the method according to the invention. The invention further aims to avoid or overcome the disadvantages of the prior art and to achieve additional advantages, as are apparent from the present specification.

The above objects have been achieved in a method of regulating light transmission of an electrochromic glass according to the invention, wherein the actual voltage existing or prevailing on the glass is determined and compared with a desired voltage value or reference voltage and, depending on the deviation or difference value of the actual voltage from the reference voltage, a control voltage of positive or negative polarity is applied to the glass to generate a control current flow. The control voltage remains applied until the actual voltage is substantially equal to the reference voltage. After the specified voltage level has been reached, the control voltage is switched off or reduced until no control current flows in the glass. Intermittently, at measuring intervals during a holding period, i.e., a period when there is no control current flow in the glass, the actual voltage on the glass is again measured and compared to the reference voltage or a threshold value. If it is determined that the actual value of the voltage on the glass deviates from the reference voltage by more than a predetermined threshold amount or value, then the control voltage is again applied to the glass with the appropriate polarity to minimize the deviation and is maintained until the actual voltage across the glass is again substantially equal to the reference voltage.

The method according to the invention provides the essential advantage that the appropriate reference voltages (with a defined current limit when applicable) and the time periods for the measuring intervals and charging or discharging periods are governed by the construction, the material, and the dimensions of the electrochromic glass. Thus, these parameters are adaptable to the specific electrochromic glass. A further advantage of the invention is that the automatic control or regulation electronics can be provided as an integrated component of the electrochromic glass or as a separate unit. The voltage supply for the automatic control or regulation electronics can be supplied, for example, by the on-board power supply network of an aircraft or by an automobile battery, or the like, depending on the particular application.

Embodiments of the invention provide that the control parameters, such as measuring intervals, voltage charging or discharging periods, and/or the reference voltages are variable during the automatic control operations. The automatic control operations may be carried out with discrete electronic components using threshold value queries or sampling and comparisons carried out by comparators. In a preferred embodiment, the automatic control is performed by a microcontroller or microprocessor that processes analog-to-digital converted signals using appropriate software to carry out the comparisons, timing, and other functions.

In an alternative embodiment of the invention, the light transmission of the glass, i.e. the charging or discharging of the glass, is regulated or controlled by measuring the control current flow in the glass, rather than by controlling the control voltage and the charging or discharging time period.

A circuit arrangement according to the invention for performing the method includes a computer or microprocessor, a power voltage follower, and a voltage reversing device. An input of the computer or microprocessor is connected via an analog-digital converter (A/D or ADC) to a component that provides a reference voltage set point, and an output of the computer or microprocessor is connected via a digital-analog converter (D/A or DAC) to the voltage follower and to the voltage reversing device. An output of the voltage reversing device is electrically connected to an input of the electrochromic glass. Also, the electrochromic glass as well as the voltage reversing device are connected via an analog-digital converter to an input of the computer or microprocessor.

DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
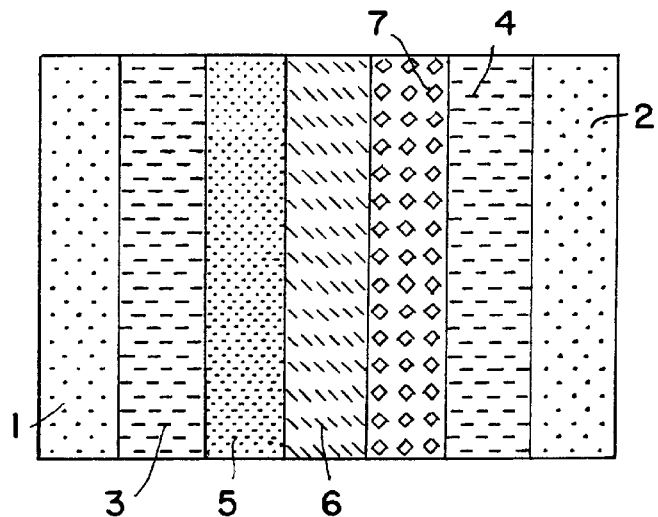
FIG. 1 shows a cross-section of a conventional electrochromic glass construction.

FIG. 1 shows a conventional electrochromic glass construction in cross-section. This conventional construction has been described above herein. The inventive method and circuit arrangement can be used in connection with any conventional electrochromic glass construction, for example such as that shown in FIG.1.

Figure 2:
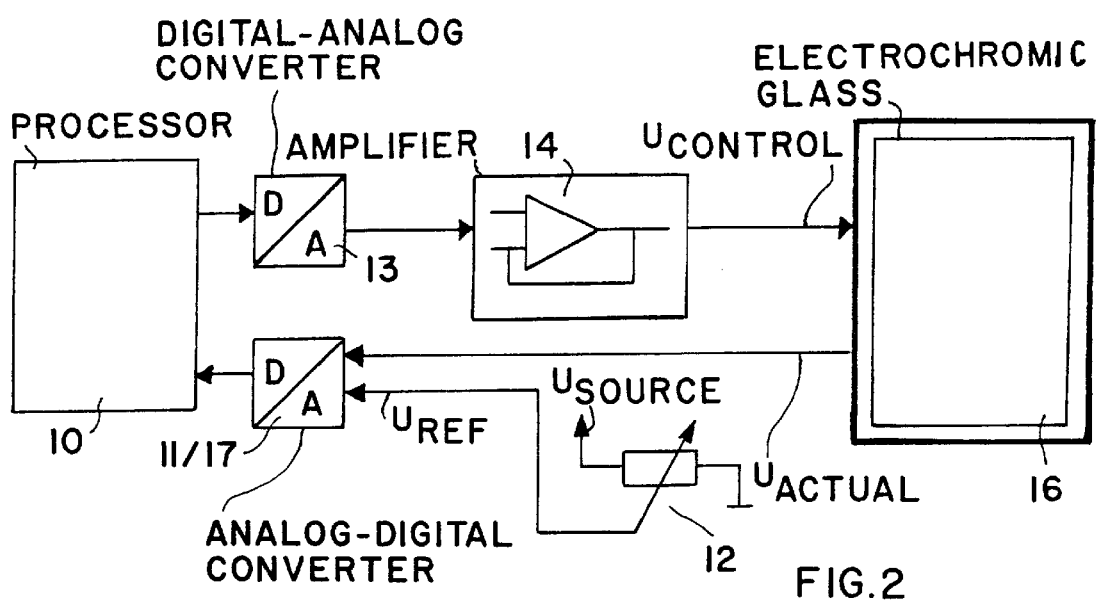
FIG. 2 is a block diagram of a circuit arrangement for regulating the light transmission of an electrochromic glass according to the method of the invention.
Figure 3:
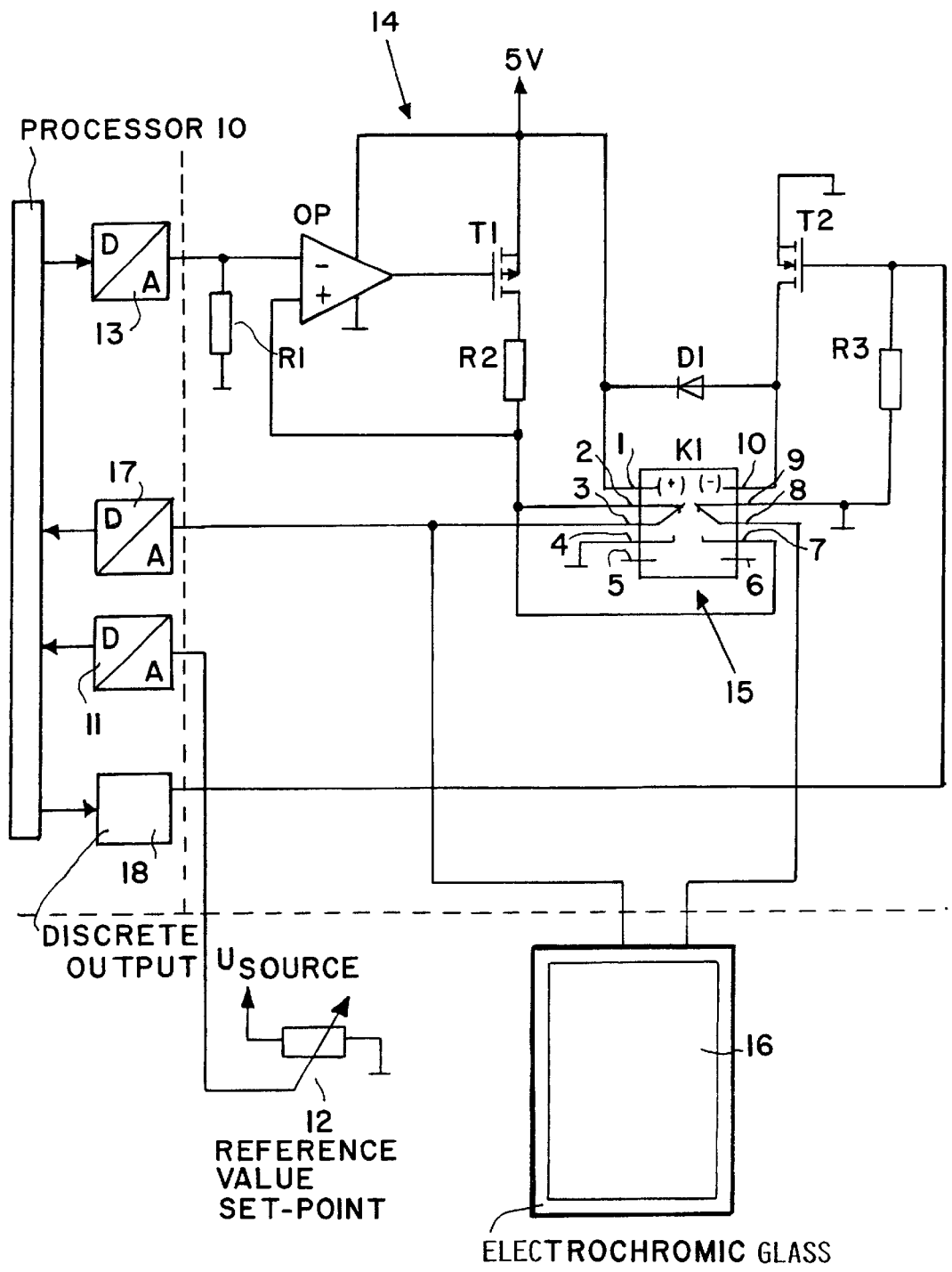
FIG. 3 is a block circuit diagram showing further details of the circuit arrangement of FIG. 2.

FIGS. 2 and 3 show a circuit arrangement according to the invention for regulating the light transmission of an electrochromic glass 16. The circuit arrangement comprises essentially a power voltage follower or amplifier 14 and a voltage reversing device 15, a variable resistor or potentiometer 12 for setting a reference voltage set point, and a microprocessor or computer 10. The voltage follower 14, which in principle represents a precisely regulated voltage source, includes an operational amplifier or op-amp OP, a first MOSFET T1, and a current limiting resistor R2, connected as shown in the drawings. By way of example, the voltage follower 14 is designed with a power output of approximately 5 watts. The microprocessor or computer 10 feeds a very small control voltage, for example from 0 to 2 volts, through a digital-analog converter (D/A) 13 to a negative input of the operational amplifier OP.

The voltage follower 14 will consequently always attempt to bring a positive input of the operational amplifier OP to the same potential as that of the negative input. Thus, the voltage of the output (connected with the positive input of the operational amplifier OP) follows the voltage of the input (negative input of the operational amplifier OP). As a result, if a load is applied to the output, such as a charging current for the electrochromic glass 16, then the operational amplifier OP will maintain a constant voltage applied to the glass 16 by means of the first MOSFET T1. In other words, the operational amplifier OP regulates the voltage applied to the electrochromic glass 16.

The voltage reversing device 15 includes a relay K1, a second MOSFET T2, and a diode D1 connected as shown in the drawings. The voltage follower 14 uses the voltage reversing device 15 to drive the glass 16 to an opposite polarity if necessary and can thereby drive the glass to a positive or to a negative polarity, i.e., can "charge" or "discharge" the glass 16. The mictoprocessor or computer 10 digitally drives the second MOSFET T2, which recognizes only the states "ON" or "OFF", from a discrete output 18 of the microprocessor 10. In this way, the second MOSFET T2 switches the relay K1 between the two switching states, i.e. between "charging" and "discharging" the glass 16. The diode D1 protects the second MOSFET T2 from voltage peaks resulting from relay coil inductivities arising during the switching operations.

The circuit -arrangement provides the following three states: (1) charging, i.e. darkening or reducing the transparency of the electrochromic glass 16; (2) discharging, i.e. bleaching or increasing the transparency of the electrochromic glass 16; and (3) measuring the voltage across the electrochromic glass 16. In the embodiment shown in FIG. 3, when charging the electrochromic glass 16, the relay K1 is in a quiescent or non-operative state, the voltage at the gate of the second MOSFET T2 is 0 volts, and the input voltage of the voltage follower 14 (D/A channel 0/1) is in a range of approximately 0 to 2 volts. When discharging the electrochromic glass 16, the relay K1 is in a switched state, the voltage at the gate of the second MOSFET T2 is 5 volts, and the input voltage of the voltage follower 14 (D/A channel 0/1) is in a range of approximately 0 to 1 volt. When measuring the voltage of the electrochromic glass 16, which is possible only in the absence of a charging or discharging current, the relay K1 is in the quiescent or non-operative state, and the input voltage of the voltage follower 14 (D/A channel 0/1) is 0 volts.

The automatic control or regulation procedure will now be described, based on the example of charging the electrochromic glass 16. Initially, the basic state of the glass 16 is "transparent", that is the glass 16 is in a "discharged" state. In order to darken or color the glass 16 to a certain value as desired by a user, the variable resistor or potentiometer 12 is adjusted so that the set point corresponds to a reference voltage that results in the desired degree of transparency or light transmission. The computer 10 measures the value that is set at the potentiometer tap, through an analog-digital converter 11 for example, and uses this value as a reference for the limit or final value of the voltage on the glass 16. The microprocessor or computer 10 now begins to charge the glass 16 with the maximal admissible voltage, e.g. applying a control voltage having the maximum voltage value that will not cause damage to the glass 16. The glass 16 now becomes colored or darkened. After a certain time period that is specified by the software being executed in the computer 10 (for example several seconds), the charging operation is briefly interrupted and the actual voltage on the glass 16 is measured, for example by the computer 10 through an analog-digital converter 17. If the voltage is still too low, i.e. less than the selected reference voltage set point, then a further charging cycle is carried out. If the voltage is too high, then a discharging cycle follows. In this way, the voltage on the glass is maintained at a substantially constant value within a defined range and thereby the light transmission of the glass is maintained at the desired level even though the control voltage is not continuously applied.

The above sequence continues until a user readjusts the reference value set point on the variable resistor or potentiometer 12 and thus changes the reference voltage or control input. Thereupon the same method sequence continues, so as to drive the actual voltage on the glass to the new reference value. The method according to the invention allows the light transmission of the electrochromic glass 16 to be rapidly adjusted, whereby the electrical specification of the glass 16 can be maintained in an advantageous manner. The time period or duration of each active voltage driving phase and each measuring and/or holding phase can be selected and adjusted in the software of the computer, depending on the time characteristic behavior of the particular electrochromic glass, for example.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A circuit arrangement for regulating light transmission of an electrochromic glass, said circuit arrangement comprising:

a microprocessor having a first microprocessor input, a second microprocessor input, and a microprocessor output;

a voltage follower comprising a regulated voltage source;

a voltage reversing device having two voltage reversing outputs;

a first analog-to-digital converter;

a second analog-to-digital converter;

a digital-to-analog converter;

a variable reference voltage device; and an electrochromic glass having a first terminal and a second terminal;

wherein said variable reference voltage device is connected to said first microprocessor input of said microprocessor via said first analog-to-digital converter;

wherein said microprocessor output of said microprocessor is connected to said voltage follower via said digital-to-analog converter;

wherein said voltage reversing outputs of said voltage reversing device are electrically connected to said first and second terminals of said electrochromic glass;. and wherein said second terminal of said electrochromic glass and one of said voltage reversing outputs of said voltage reversing device are connected to said second microprocessor input of said microprocessor via said second analog-to-digital converter.

2. The circuit arrangement according to claim 1, wherein said voltage follower includes an operational amplifier, a MOSFET, and a current limiting resistor.

3. The circuit arrangement according to claim 1, wherein said voltage reversing device includes a relay, a MOSFET, and a diode.

4. The circuit arrangement according to claim 3, wherein said microprocessor further has a discrete output, and said MOSFET is electrically connected to said discrete output.

* * * * *